(12) United States Patent
Du

(10) Patent No.: US 12,483,052 B2
(45) Date of Patent: Nov. 25, 2025

(54) BIDIRECTIONAL CHARGING DETECTION CIRCUIT AND DATA CABLE

(71) Applicants: Shenzhen Yuanai Electronic Technology Co., Ltd.; Dongguan XCOSO Electronic Tech Co., Ltd, Guangdong (CN); Shenzhen Chenqian Top Technology Co., LTD, Guangdong (CN)

(72) Inventor: Changbo Du, Guangdong (CN)

(73) Assignees: Shenzhen Yuanai Electronic Technology Co., Ltd., Shenzhen (CN); Dongguan XCOSO Electronic Tech Co., Ltd, Dongguan (CN); Shenzhen Chenqian Top Technology Co., LTD, Shenzhen (CN)

( * ) Notice: Subject to any disclaimer, the term of this patent is extended or adjusted under 35 U.S.C. 154(b) by 528 days.

(21) Appl. No.: 17/568,710

(22) Filed: Jan. 4, 2022

(65) Prior Publication Data

US 2023/0139326 A1 May 4, 2023

(30) Foreign Application Priority Data

Nov. 1, 2021 (CN) .......................... 202122639434.4

(51) Int. Cl.
*H01M 10/46* (2006.01)
*G01R 19/14* (2006.01)
*H02J 7/00* (2006.01)

(52) U.S. Cl.
CPC ............ *H02J 7/0047* (2013.01); *G01R 19/14* (2013.01); *H02J 7/007* (2013.01)

(58) Field of Classification Search
CPC .......... H02J 7/007; H02J 7/0047; G01R 19/14
USPC .......................................... 320/107, 111, 114
See application file for complete search history.

(56) References Cited

U.S. PATENT DOCUMENTS

| | | | |
|---|---|---|---|
| 7,656,127 B1 * | 2/2010 | Shutt ...................... | H01M 10/46 |
| | | | 320/134 |
| 2022/0200304 A1 * | 6/2022 | Chang .................. | H01R 13/665 |

FOREIGN PATENT DOCUMENTS

| | | | | |
|---|---|---|---|---|
| WO | WO-2022022586 A1 * | 2/2022 | .............. | F21L 4/005 |
| WO | WO-2023273142 A1 * | 1/2023 | ......... | G06F 13/4081 |

\* cited by examiner

*Primary Examiner* — Edward Tso

(57) ABSTRACT

Disclosed is a bidirectional charging detection circuit and a data cable. The circuit includes a first charging interface, a second charging interface electrically connected to the first charging interface, a sampling resistor connected in series between the first charging interface and the second charging interface, and a processing module electrically connected to the sampling resistor and used for identifying a direction of a charging current; wherein the processing module is provided with a first current sampling terminal and a second current sampling terminal. A technical solution of the present disclosure can identify the direction and magnitude of the charging current between the first charging interface and the second charging interface, and can improve reliability and safety of charging.

8 Claims, 4 Drawing Sheets

BIDIRECTIONAL CHARGING DETECTION CIRCUIT AND DATA CABLE

CROSS REFERENCE TO RELATED APPLICATIONS

The present application claims the benefit of Chinese Patent Application No. 202122639434.4 filed on Nov. 1, 2021, the contents of which are incorporated herein by reference in their entirety.

TECHNICAL FIELD

The present disclosure relates to a data cable, in particular to a bidirectional charging detection circuit and a data cable.

BACKGROUND

Most electronic products in the prior art are charged with data cables. Generally, the data cable has a USB interface at one terminal and an Apple interface, a Micro-A interface or a Type-C interface at the other terminal, serving as a charging input terminal and a charging output terminal respectively. A charging current flows out unidirectionally from the charging input terminal to the charging output terminal. Some data cables also use two identical interfaces, one of which is connected to a power supply device and the other is connected to a charging device. Bidirectional charging is achieved on account of the two interchangeable interfaces. In practical use, the bidirectional charging data cable cannot effectively identify directions and magnitudes of the charging currents at its charging output terminal and charging input terminal, resulting in potential safety hazards during charging.

In view of this, it is necessary to further improve the structure of the current data cable.

SUMMARY

In order to solve at least one of the above technical problems, a main objective of the present disclosure is to provide a bidirectional charging detection circuit and a data cable.

In order to achieve the above objective, a technical solution used by the present disclosure is to provide the bidirectional charging detection circuit. The bidirectional charging detection circuit includes a first charging interface, a second charging interface electrically connected to the first charging interface, a sampling resistor connected in series between the first charging interface and the second charging interface, and a processing module electrically connected to the sampling resistor and used for identifying a direction of a charging current; the processing module is provided with a first current sampling terminal and a second current sampling terminal, the first current sampling terminal being connected to a common contact between the first charging interface and the sampling resistor, and being used for collecting a first charging current flowing from the first charging interface to the second charging interface and passing through the sampling resistor, the second current sampling terminal being connected to a common contact between the second charging interface and the sampling resistor, and being used for collecting a second charging current flowing from the second charging interface to the first charging interface and passing through the sampling resistor, and the first charging current and the second charging current having opposite directions.

The common contact connected to the sampling resistor and the first charging interface is earthed, or the common contact connected to the sampling resistor and the second charging interface is earthed.

The processing module includes an integrated operational amplifier unit connected to the first current sampling terminal and the second current sampling terminal respectively, a processing unit electrically connected to the integrated operational amplifier unit, and a charging control unit electrically connected to the processing unit and used for controlling charging.

The bidirectional charging detection circuit further includes a display unit electrically connected to the processing unit and used for displaying magnitudes of the first charging current and the second charging current.

The processing module is further provided with a voltage sampling terminal connected to the integrated operational amplifier unit, the voltage sampling terminal being connected to a voltage sampling unit for sampling a charging voltage.

The voltage sampling unit includes a tenth resistor and an eleventh resistor connected in series, the other terminal of the tenth resistor is connected to the charging voltage, the other terminal of the eleventh resistor is earthed, the voltage sampling terminal is connected to a common contact connected to the tenth resistor and the eleventh resistor, and the display unit is further used for displaying magnitude(s) of the charging voltage and/or charging power.

The bidirectional charging detection circuit further includes a voltage conversion chip electrically connected to the tenth resistor and used for converting the charging voltage into a set voltage.

The display unit is arranged close to the first charging interface or the second charging interface.

The first charging interface and the second charging interface are both Type-C interfaces.

In order to achieve the above objective, another technical solution used by the present disclosure is to provide the data cable, which includes the bidirectional charging detection circuit.

The technical solution of the present disclosure mainly includes the first charging interface, the second charging interface, the sampling resistor and the processing module. The processing module is provided with the first current sampling terminal and the second current sampling terminal. After the charging current is collected by the first current sampling terminal and the second current sampling terminal, the charging current is transmitted to the processing module and identified by the processing module, and the processing module identifies the magnitude and the direction of the charging current from the first charging interface to the second charging interface or from the second charging interface to the first charging interface, so as to stably charge a device to be charged and improve reliability and safety of charging.

BRIEF DESCRIPTION OF THE DRAWINGS

In order to describe the technical solutions in the embodiments of the present disclosure or in the prior art more clearly, the accompanying drawings required in descriptions of the embodiments or the prior art will be briefly described below. Apparently, the accompanying drawings in the following descriptions show merely some embodiments of the present disclosure, and a person of ordinary skill in the art

The implementation, functional features and advantages of the present disclosure will be further described in conjunction with embodiments and with reference to accompanying drawings.

DETAILED DESCRIPTION OF THE EMBODIMENTS

The technical solutions in the embodiments of the present disclosure will be clearly and completely described below in combination with the accompanying drawings in the embodiments of the present disclosure. Apparently, the embodiments described below are merely some rather than all of the embodiments of the present disclosure. All other embodiments obtained by a person of ordinary skill in the art based on the embodiments of the present disclosure without inventive efforts shall fall within the protection scope of the present disclosure.

It should be noted that the terms "first", "second", etc. used in description of the present disclosure are merely used for describing purposes and may not be understood as indicating or implying relative importance, or implicitly indicating the number of indicated technical features. Therefore, the features defined with "first" and "second" may explicitly or implicitly include at least one of the features. In addition, technical solutions of various embodiments can be combined with each other on the premise that such a combination can be implemented by a person of ordinary skill in the art. When the combination of technical solutions is contradictory or impossible to implement, it should be considered that such a combination of the technical solutions does not exist and shall not fall within the protection scope claimed by the present disclosure.

In a bidirectional charging data cable in the prior art, a direction of a charging current of a charging output terminal and a charging input terminal may not be effectively identified, resulting in potential safety hazards during charging. Different from the bidirectional charging data cable in the prior art, the present disclosure provides a bidirectional charging detection circuit, which aims at detecting the direction and magnitude of a charging current between a first charging interface and a second charging interface, so as to achieve safe and reliable charging. The following embodiments may be referred to for a specific structure of the bidirectional charge detection circuit.

Figure 1:
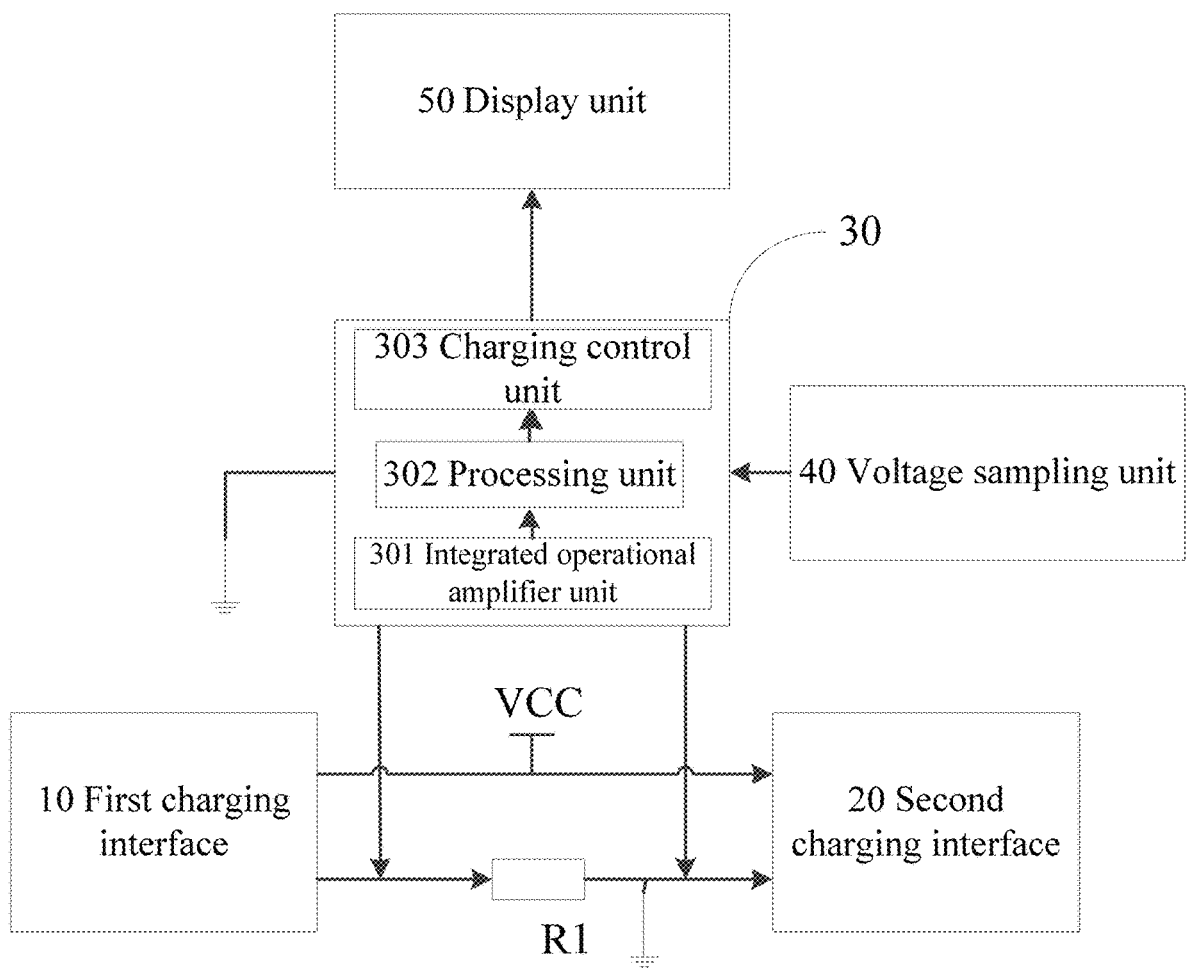
FIG. 1 is a block diagram of modules of a bidirectional charging detection circuit according to an embodiment of the present disclosure.

With reference to FIG. 1, FIG. 1 is a block diagram of modules of a bidirectional charging detection circuit according to an embodiment of the present disclosure. In the embodiment of the present disclosure, the bidirectional charging detection circuit includes a first charging interface 10, a second charging interface 20 electrically connected to the first charging interface 10, a sampling resistor R1 connected in series between the first charging interface 10 and the second charging interface 20, and a processing module 30 connected to the sampling resistor R1 and used for identifying a direction of a charging current; the processing module 30 is provided with a first current sampling terminal and a second current sampling terminal, the first current sampling terminal being connected to a common contact between the first charging interface 10 and the sampling resistor R1, and being used for collecting a first charging current flowing from the first charging interface 10 to the second charging interface 20 and passing through the sampling resistor R1, the second current sampling terminal being connected to a common contact between the second charging interface 20 and the sampling resistor, and being used for collecting a second charging current flowing from the second charging interface 20 to the first charging interface 10 and passing through the sampling resistor R1, and the first charging current and the second charging current having opposite directions.

Specifically, the bidirectional charging detection circuit is used in the data cable. Types of the first charging interface 10 and the second charging interface 20 may be flexibly set according to actual requirements. The types of the first charging interface 10 and the second charging interface 20 are the same. One of the first charging interface 10 and the second charging interface 20 is connected to a power supply device, and the other is connected to a device to be charged. The sampling resistor R1 and the first current sampling terminal constitute a first current sampling branch for collecting the first charging current passing through the sampling resistor R1 during charging from the first charging interface 10 to the second charging interface 20. The sampling resistor R1 and the second current sampling terminal constitute a second current sampling branch for collecting the second charging current passing through the sampling resistor R1 during charging from the second charging interface 20 to the first charging interface 10. In the solution, after the charging current is collected by the first current sampling branch and the second current sampling branch, the charging current is transmitted to the processing module 30, and identified by the processing module 30. After the processing module 30 identifies the charging current, the power supply device may be controlled to charge the device to be charged stably, so as to improve the reliability and safety of charging.

Figure 2:
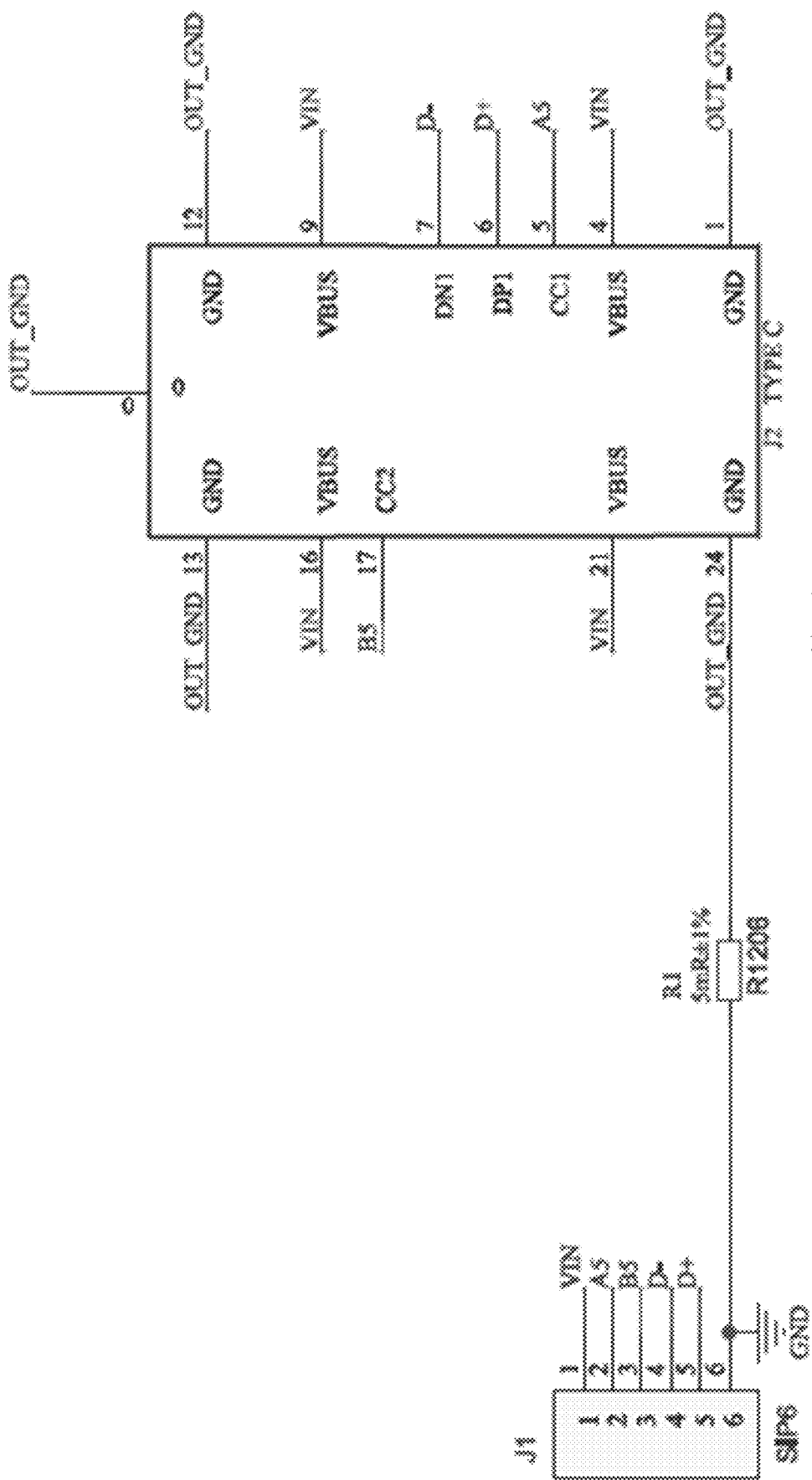
FIG. 2 is a circuit diagram of a first charging interface and a second charging interface according to an embodiment of the present disclosure.

With reference to FIG. 2, FIG. 2 is a circuit diagram of a first charging interface 10 and a second charging interface 20 according to an embodiment of the present disclosure. In a particular embodiment, the common contact connected to the sampling resistor R1 and the first charging interface 10 is earthed. In a parallel solution, the common contact connected to the sampling resistor R1 and the second charging interface 20 is earthed. The sampling resistor R1 is a single resistor. When the power supply device charges the device to be charged at the second charging interface 20 through the first charging interface 10, the charging current passes through the sampling resistor R1, at the moment, the charging current on the sampling resistor R1 may be collected, and the charging current is transmitted to the processing module 30 and identified as the first charging current by the processing module 30. When the power supply device charges the device to be charged at the first charging interface 10 through the second charging interface 20, the charging current passes through the sampling resistor R1, at the moment, the charging current on the sampling resistor R1 may be collected, and the charging current is transmitted to the processing module 30 and identified as the second charging current by the processing module 30.

Specifically, the processing module 30 includes an integrated operational amplifier unit 301 connected to the first current sampling terminal and the second current sampling terminal respectively, a processing unit 302 electrically connected to the integrated operational amplifier unit 301, and a charging control unit 303 electrically connected to the processing unit 302 and used for controlling charging.

Specifically, the integrated operational amplifier unit 301 is an integrated operational amplifier, which may amplify the charging current collected by the first current sampling terminal and the charging current collected by the second current sampling terminal, and a specific magnification may be set according to actual requirements, which is not limited herein. The processing unit 302 may identify the collected charging current. For example, the processing unit 302 identifies the charging current collected by the first current sampling terminal as the first charging current and the charging current collected by the second current sampling terminal as the second charging current. The charging control unit 303 controls the power supply device to charge the device to be charged according to an identification result. Specifically, when the processing unit 302 identifies the direction of the first charging current, the charging control unit 303 controls the power supply device connected to the first charging interface 10 to charge the device to be charged connected to the second charging interface 20 in a first way. When the processing unit 302 identifies the direction of the second charging current, the charging control unit 303 controls the power supply device connected to the second charging interface 20 to charge the device to be charged connected to the first charging interface 10 in a second way.

In a particular embodiment, the bidirectional charging detection circuit further includes a display unit 50 electrically connected to the processing unit 302 and used for displaying magnitudes of the first charging current and the second charging current. The display unit 50 is a liquid crystal display, and information displayed by the display unit 50 includes a current direction, numbers, units, etc., so as to facilitate reading of current data.

Specifically, the processing module 30 is further provided with a voltage sampling terminal connected to the integrated operational amplifier unit 301, the voltage sampling terminal being connected to a voltage sampling unit 40 for sampling a charging voltage. After collected by the voltage sampling terminal, the charging voltage is amplified by the integrated operational amplifier unit 301, processed by the processing unit 302 and displayed by the display unit 50 finally.

Figure 3:
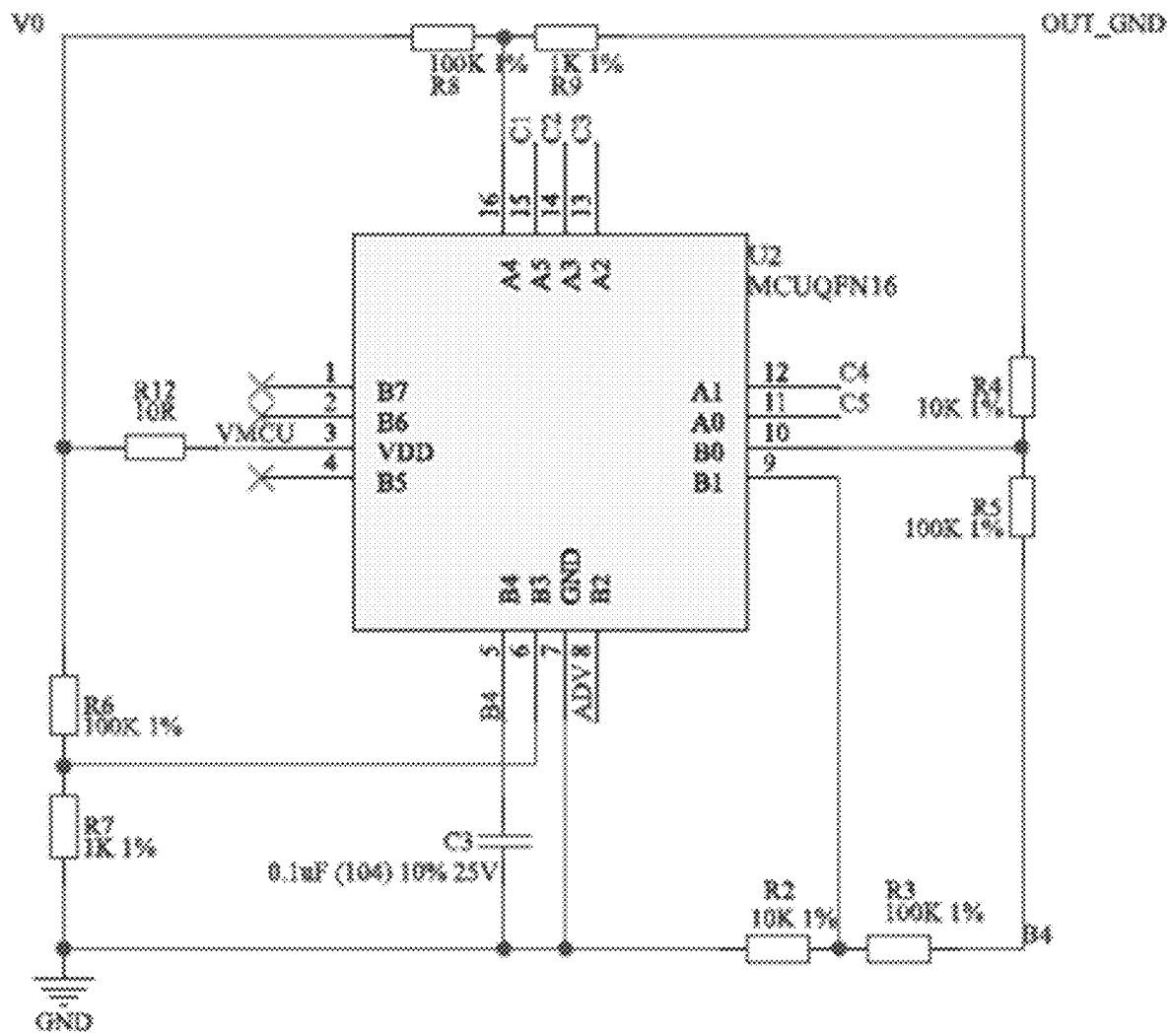
FIG. 3 is a schematic diagram of a circuit of a processing unit according to an embodiment of the present disclosure.
Figure 4:
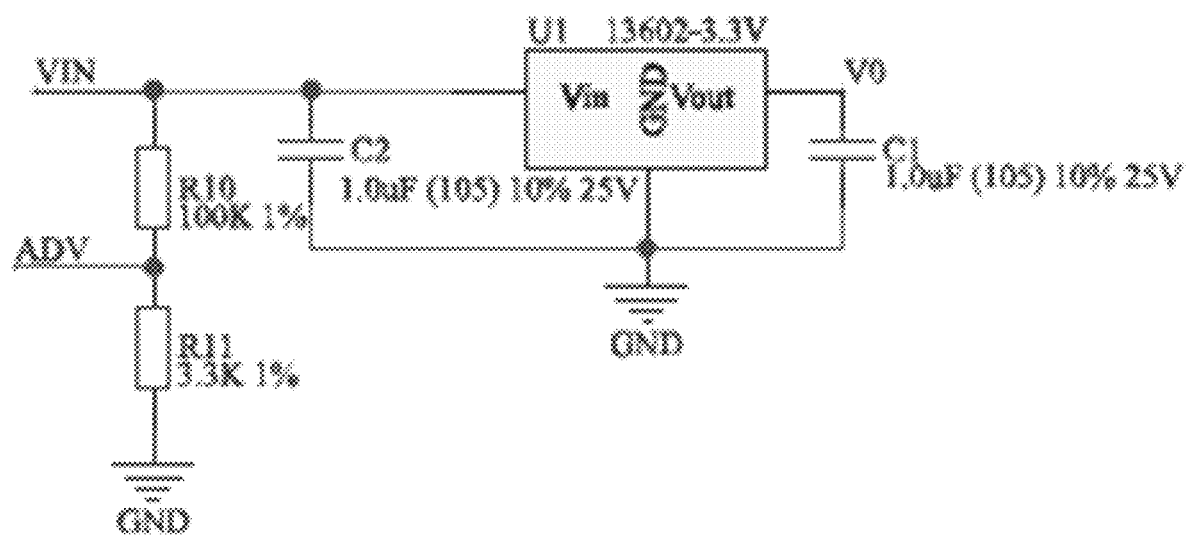
FIG. 4 is a circuit diagram of a voltage sampling unit and a voltage conversion chip according to an embodiment of the present disclosure.

With reference to FIGS. 3 and 4, FIG. 3 is a schematic diagram of a circuit of a processing unit 302 according to an embodiment of the present disclosure, and FIG. 4 is a circuit diagram of a voltage sampling unit 40 and a voltage conversion chip according to an embodiment of the present disclosure. In a particular embodiment, the voltage sampling unit 40 includes a tenth resistor R10 and an eleventh resistor R11 connected in series, the other terminal of the tenth resistor R10 is connected to the charging voltage, the other terminal of the eleventh resistor R11 is earthed, the voltage sampling terminal is connected to a common contact connected to the tenth resistor R10 and the eleventh resistor R11, and the display unit 50 is further used for displaying magnitude(s) of the charging voltage and/or charging power. The voltage sampling terminal collects a voltage between the tenth resistor R10 and the eleventh resistor R11, which is close to the charging voltage. Based on magnitudes of the charging current and the charging voltage, the display may also display, based on the charging voltage and the charging current, the charging power when the power supply device charges the device to be charged.

In a particular embodiment, the bidirectional charging detection circuit further includes a voltage conversion chip electrically connected to the tenth resistor R10 and used for converting the charging voltage into a set voltage. The voltage conversion chip stabilizes the charging voltage provided by the power supply device. In order to reduce clutter of the charging voltage, the voltage conversion chip may also be connected to an earthed capacitor, so as to remove the clutter and guarantee stability and reliability of the charging voltage.

Figure 5:
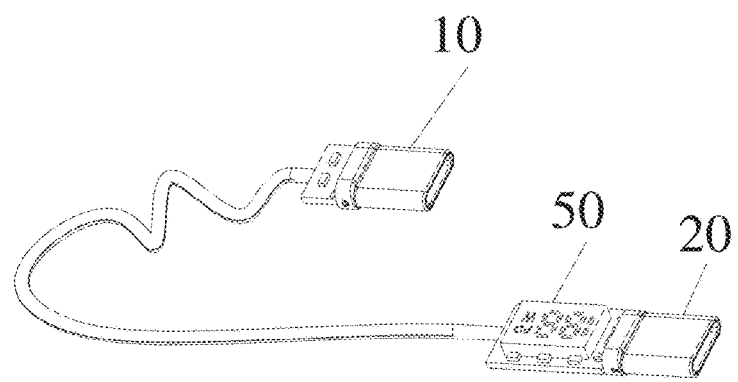
FIG. 5 is a structural schematic diagram of a data cable of the present disclosure.

With reference to FIG. 5, FIG. 5 is a structural schematic diagram of the data cable of the present disclosure. Specifically, the display unit 50 is arranged close to the first charging interface 10 or the second charging interface 20. It may be understood that the bidirectional charge detection circuit is arranged on a data connector with a printed circuit board (PCB). The display unit 50 is arranged close to the data connector, or the display unit 50 is arranged on the PCB.

In a particular embodiment, the first charging interface 10 and the second charging interface 20 are both Type-C interfaces. The Type-C interface is a common charging interface for smart devices, such that the power supply device may charge the device to be charged. The first charging interface 10 and the second charging interface 20 are the same interfaces. It may be understood that the first charging interface 10 and the second charging interface 20 may also be different interfaces, and charging may also be achieved through the first charging interface 10 and the second charging interface 20.

In the embodiment of the present disclosure, the data cable includes the bidirectional charging detection circuit. The above embodiments may be referred to for the particular structure of the bidirectional charge detection circuit, which will not be repeated herein. Since the data cable of the solution uses the bidirectional charge detection circuit, the data cable has all the advantages and effects of the bidirectional charge detection circuit.

What are described above are merely preferred embodiments of the present disclosure, and are not intended to limit the patent scope of the present disclosure. Any equivalent structure transformation made using the contents of the specification and the accompanying drawings of the present disclosure according to conception of the technical solution of the present disclosure, or any direct or indirect application thereof in other related technical fields shall fall within the patent protection scope of the present disclosure.

What is claimed is:

1. A bidirectional charging detection circuit, comprising a first charging interface, a second charging interface electrically connected to the first charging interface, a sampling resistor connected in series between the first charging interface and the second charging interface, and a processing module electrically connected to the sampling resistor and used for identifying a direction of a charging current; wherein the processing module is provided with a first current sampling terminal and a second current sampling terminal, the first current sampling terminal being connected to a common contact between the first charging interface and the sampling resistor, and being used for collecting a first charging current flowing from the first charging interface to the second charging interface and passing through the sampling resistor, the second current sampling terminal being connected to a common contact between the second charging interface and the sampling resistor, and being used for collecting a second charging current flowing from the second charging interface to the first charging interface and passing through the sampling resistor, and the first charging current and the second charging current having opposite directions;

wherein the processing module comprises an integrated operational amplifier unit connected to the first current sampling terminal and the second current sampling terminal respectively, a processing unit electrically connected to the integrated operational amplifier unit, and a charging control unit electrically connected to the processing unit and used for controlling charging; and wherein the processing module is further provided with a voltage sampling terminal connected to the integrated operational amplifier unit, the voltage sampling terminal being connected to a voltage sampling unit for sampling a charging voltage.

2. The bidirectional charging detection circuit according to claim 1, wherein the common contact connected to the sampling resistor and the first charging interface is earthed, or the common contact connected to the sampling resistor and the second charging interface is earthed.

3. The bidirectional charging detection circuit according to claim 1, further comprising a display unit electrically connected to the processing unit and used for displaying magnitudes of the first charging current and the second charging current.

4. The bidirectional charging detection circuit according to claim 1, wherein the voltage sampling unit comprises a tenth resistor and an eleventh resistor connected in series, the other terminal of the tenth resistor is connected to the charging voltage, the other terminal of the eleventh resistor is earthed, the voltage sampling terminal is connected to a common contact connected to the tenth resistor and the eleventh resistor, and the display unit is further used for displaying magnitude(s) of the charging voltage and/or charging power.

5. The bidirectional charging detection circuit according to claim 4, further comprising a voltage conversion chip electrically connected to the tenth resistor and used for converting the charging voltage into a set voltage.

6. The bidirectional charging detection circuit according to claim 3, wherein the display unit is arranged close to the first charging interface or the second charging interface.

7. The bidirectional charging detection circuit according to claim 1, wherein the first charging interface and the second charging interface are both Type-C interfaces.

8. A data cable, comprising the bidirectional charge detection circuit according to claim 1.

* * * * *